United States Patent [19]

Uda

[11] Patent Number: 5,291,357
[45] Date of Patent: Mar. 1, 1994

[54] MAGNETIC RECORDING DEVICE HAVING REDUCED ELECTROMAGNETIC INTERFERENCE

[75] Inventor: Takeshi Uda, Naka, Japan

[73] Assignee: Nippon Densan Corporation, Kyoto, Japan

[21] Appl. No.: 720,905

[22] Filed: Jun. 25, 1991

[30] Foreign Application Priority Data

Jun. 29, 1990 [JP] Japan .................................. 2-172873
Jun. 30, 1990 [JP] Japan .................................. 2-173158

[51] Int. Cl.⁵ .......................... G11B 17/02; G11B 5/54
[52] U.S. Cl. .................................. 360/99.08; 360/106
[58] Field of Search .................. 310/156, 185, 181; 360/99.08, 99.09, 99.11, 99.04, 98.07, 106

[56] References Cited

U.S. PATENT DOCUMENTS

| 4,275,426 | 6/1981 | Hoffman | 360/99.04 |
|---|---|---|---|
| 4,359,763 | 11/1982 | Hoffman | 360/99.04 |
| 4,620,301 | 10/1986 | Koide | 360/99.08 |
| 4,847,712 | 7/1989 | Crapo | 360/99.08 |
| 4,858,044 | 8/1989 | Crapo | 360/99.08 |
| 4,873,596 | 10/1989 | Harada et al. | 360/99.11 |
| 5,124,863 | 6/1992 | Koizumi et al. | 360/99.08 |

FOREIGN PATENT DOCUMENTS 63-50973 3/1988 Japan .................................. 360/99.04

Primary Examiner—John H. Wolff
Assistant Examiner—Craig A. Renner
Attorney, Agent, or Firm—McCormick, Paulding & Huber

[57] ABSTRACT

A magnetic recording device exhibiting reduced electromagnetic interference has a magnetic recording medium, a spindle motor for rotationally driving the magnetic recording medium, a magnetic head for writing and/or reading magnetic information and a shifting device for shifting the magnetic head. A stator core is provided with nine pole pieces divided into three groups of adjacent pole pieces. Each group of three adjacent pole pieces is wound with one of three different 3-phase coils such that adjacent pole pieces in a group have opposite polarities relative to a rotor magnet. The magnetic head is disposed corresponding to a specific slot of a stator core in the spindle motor. A shift route thereof extends outwards virtually in the radial direction from the specific slot.

1 Claim, 7 Drawing Sheets

FIG. 6-A
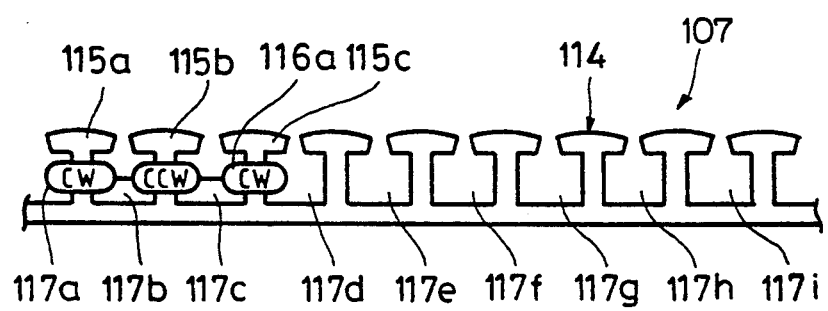
FIG. 6-B
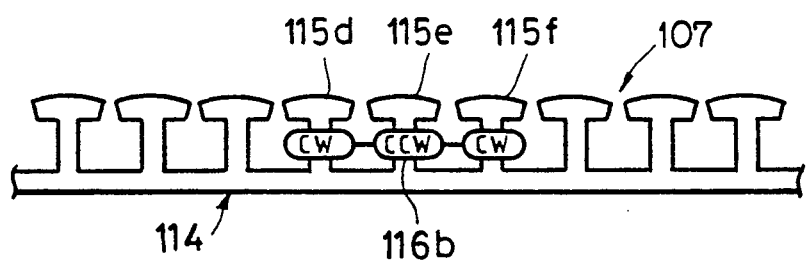
FIG. 6-C
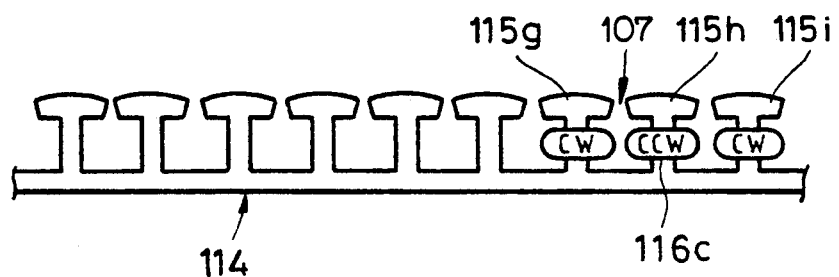

MAGNETIC RECORDING DEVICE HAVING REDUCED ELECTROMAGNETIC INTERFERENCE

BACKGROUND OF THE INVENTION

1. Field of the Invention

The present invention relates to a magnetic recording device such as a hard disc device.

2. Description of the Prior Art

A magnetic recording device typically includes a recording medium such as a magnetic disc, a spindle motor for rotationally driving this recording medium, an electromagnetic means such as a magnetic head for writing and/or reading magnetic information to and/or from the recording medium and a shift means for shifting the electromagnetic means along the surface of the recording medium. The spindle motor has a housing mounted on, e.g., a frame of the magnetic recording device, a hub relatively rotatable about the housing, a rotor magnet attached to the hub and a stator disposed opposite to this rotor magnet. The recording medium is fitted to the hub as required.

In this type of magnetic recording device, an electric current supplied to a coil of the stator is, as required, commuted corresponding to an angular position of the rotor magnet. The recording medium is thereby rotationally driven together with the hub in a predetermined direction. The electromagnetic means is, as required, shifted by action of the shift means, whereby the magnetic information is written and/or read to and/or from the recording medium.

However, electromagnetic noises tend to occur due to the commutation of the current to the coil. When the electromagnetic noises are caused, those noises exert adverse influences on the electromagnetic means via the frame of the recording device. This in turn causes errors during a write and/or read process. Particularly when writing and/or reading is effected based on digital signals, and if the electromagnetic noises are pulse-like ones, it is difficult to eliminate those noises. This also causes the errors during the write and/or read process.

Besides, in the magnetic recording device, a magnetic flux generated leaks outside from the stator and exerts adverse influences on the electromagnetic means. This causes the errors during the writing and/or reading process.

SUMMARY OF THE INVENTION

A first object of the present invention is to provide a magnetic recording device capable of preventing errors caused during a writing and/or reading process by restraining adverse influences by electromagnetic noises.

A second object of the present invention is to provide a magnetic recording device capable of reducing the adverse influences of magnetic fluxes leaking out of a stator.

Other objects and characteristics of the present invention will become apparent during the following discussion.

BRIEF DESCRIPTION OF THE DRAWINGS

FIGS. 6-A through 6-C are diagrams schematically showing the way of winding stator coils of the spindle motor in the magnetic recording device of FIG. 5;

DETAILED DESCRIPTION OF THE PREFERRED EMBODIMENTS

Embodiments of the present invention will hereinafter be described in greater detail with reference to the accompanying drawings.

FIRST EXAMPLE

Figure 1:
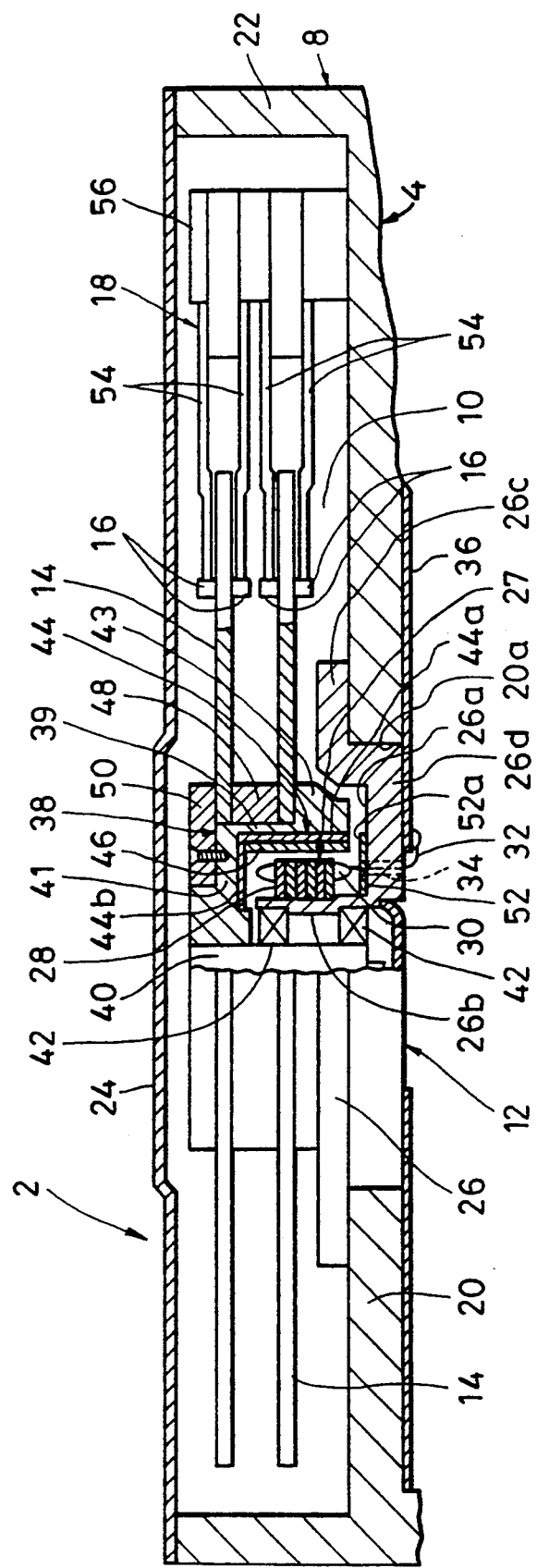
FIG. 1 is a sectional view illustrating the principal portion of a first example of a magnetic recording device according to the present invention.
Figure 2:
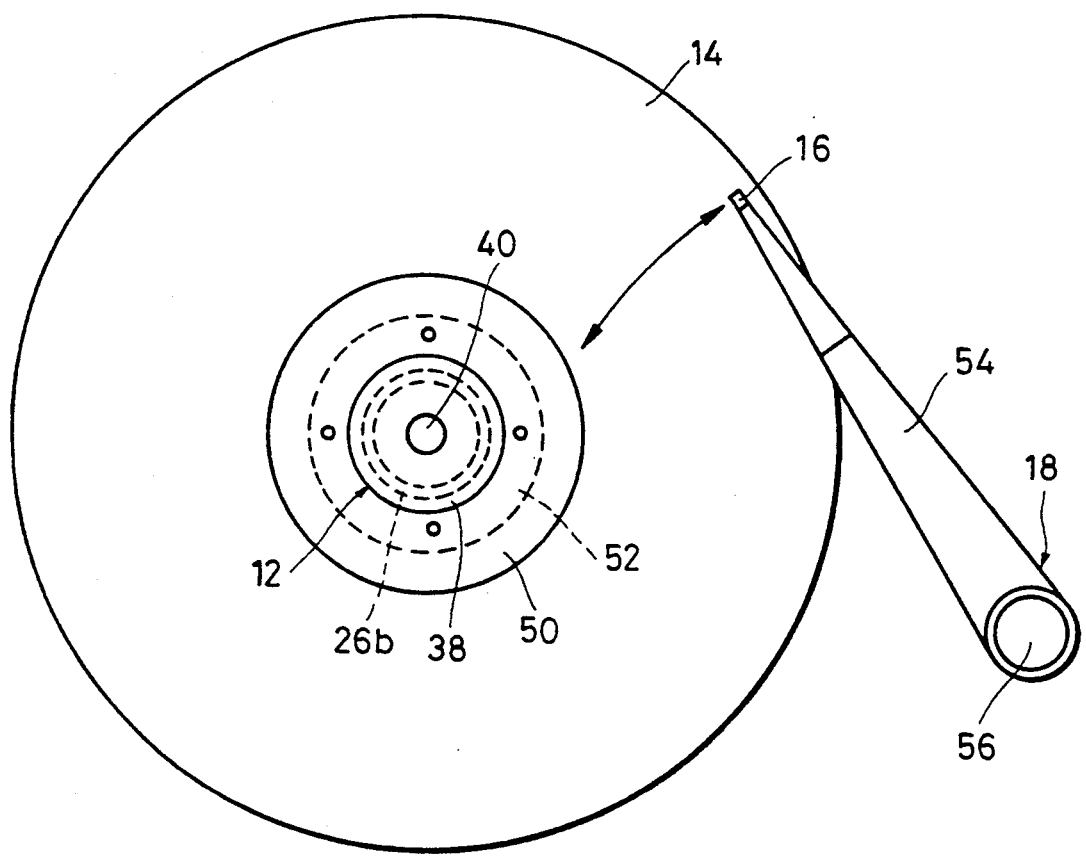
FIG. 2 is a plan view illustrating a spindle motor of the recording device of FIG. 1 and the vicinity thereof.

Referring to FIGS. 1 and 2, a first example of a magnetic recording device according to the present invention will be explained.

A magnetic recording device generally designated at 2 includes a box-like device body 4 on which a brushless spindle motor 12 is mounted. The device body 4 accommodates a lower housing 8 consisting of a board 20 and four side walls 22. This lower housing 8 has its upper surface closed by a cover member 24. The lower housing 8 and the cover member 24, as illustrated in FIG. 1, define a disk chamber 10 virtually hermetically sealed. The board 20 is formed with a circular hole 20a into which the spindle motor is fitted.

The spindle motor 12 includes a bracket 26. The bracket 26 has a bracket body 26d assuming a substantially circular configuration. An annular recess 26a is formed in an inner surface of the bracket body 26d. Provided substantially in the central part of this recess is a cylindrical support wall 26b extending in the axial direction. A flange portion 26c extending outwards in radial directions is provided on an outer peripheral portion of the bracket body 26d. This flange portion 26c is mounted on the board 20 and fixed thereto with a fitting screw (not illustrated). The bracket 26 is thus secured to the board 20. The bracket 26 is composed of aluminum especially to enhance a machining accuracy of the flange portion 26c.

The spindle motor 12 includes a hub 38 relatively rotatable about the bracket 26. The hub 38 has a cylindrical hub body 39. An end wall 41 is formed at one end of the hub body 39. A shaft member 40 is press-fitted into the end wall 41. This shaft 40 is rotatably supported on a support wall 26b of the bracket 26 through a pair of bearing members 42. A flange 43 is provided integrally with the other end of the hub body 39. A recording member 14 such as a magnetic disc is mounted on the flange 43. In the example, two pieces of recording members 14 are mounted via a spacer 48 on the flange 43. A clamp 50 is fixed to the end wall 41 of the hub 38, and these recording members 14 are thereby secured to the hub 38 as required. The hub 38 is in some cases composed of aluminum to enhance the machining accuracy of the upper surface of the flange 43.

A yoke member 44 (functioning as a first magnetic shield) is disposed inwardly of the hub 38. The yoke member 44 is formed of a magnetic material such as iron. The yoke member 44 includes an annular sleeve portion 44a disposed on an inner peripheral surface of the hub body 39 and an annular sheet portion 44b disposed on an inner surface of the end wall 41. An annular rotor magnet 46 is attached to an inner peripheral surface of this yoke member 44 (more specifically, the sleeve portion 44a).

A stator 27 is so disposed as to confront the rotor magnet 46. The stator 27 has a stator core 28 fitted to an outer peripheral surface of the support wall 26b of the bracket 26 and a coil 30 wound on the stator core 28. The bracket body 26d is formed with a through-hole 34 through which a leader line 32 is led from the coil 30 to the outside. The leader line 32 is electrically connected to a terminal of a flexible board 36 pasted over the lower surfaces of the bracket body 26d and of the board 20 of the lower housing 8. The through-hole 34 is hermetically sealed with a filler such as a bonding agent.

In accordance with the embodiment, an annular magnetic shield 52 (functioning as a second magnetic shield) is provided on an inner peripheral portion of the annular recess 26a of the bracket body 26d. The magnetic shield 52 can be formed of a sheet member composed of Permalloy to have a thickness of approximately 0.2 mm. This magnetic shield 52 has its inner peripheral edge which contacts a proximal portion of the support wall 26b and its outer peripheral edge 52a positioned opposite in close proximity to the sleeve portion 44a of the yoke member 44. Therefore, as illustrated in FIG. 1, the magnetic shield 52 and the yoke member 44 cooperate to virtually cover the upper, lower and outer peripheral surfaces of the rotor magnet 46 and the stator 27.

The disc chamber 10 accommodates a magnetic head 16 (constituting an electromagnetic means) for writing (and/or reading) magnetic information to the recording member 14. Referring mainly to FIG. 2, the magnetic heads 16 are disposed on both surfaces of the recording member 14. These heads are attached to the tips of arms 54 of shift means 18. A proximal portion of each arm 54 is secured to a rotary shaft 56. The rotary shaft 56 rotates over a predetermined range, whereby the magnetic head 16 is, as indicated by arrowheads, shifted substantially straight virtually in radial directions of the recording member 14. Note that the rotary shaft 56 is rotated by, though not illustrated, a stepping motor.

When writing (and/or reading) the magnetic information to the recording member 14, an electric current is, as required, supplied to the coil 30. The hub 38 (the recording member 14 mounted thereon) is rotated in predetermined directions about the bracket 26. The stepping motor (not shown) is, as required, controlled to shift the shift means 18. The magnetic head 16 is then operated.

At this moment, electromagnetic noises generated from the coil 30 of the stator 27 are effectively restrained by the magnetic shield 52 and the yoke member 44 as well. No adverse influence is exerted on the magnetic head 16 at all. More specifically, as is comprehensible from FIGS. 1 and 2, the upper surfaces of the stator 27 and the rotor magnet 46 are covered with the annular sheet portion 44b of the yoke member 44. The outer peripheral surfaces thereof in the radial directions are covered with the sleeve portion 44a of the yoke member 44. The lower surfaces thereof are further covered with the magnetic shield 52. Hence, a large proportion of the magnetic noises generated pass through a magnetic path configured by the magnetic shield 52 and the yoke member 44, resulting in no leakage to the outside. Therefore, the great majority of the magnetic noises do not come to the magnetic head 16. The adverse influences caused by the magnetic noises, i.e., write (and/or read) errors are effectively prevented. The magnetic shield 52 is disposed on the inner surface of the bracket body 26d. It is therefore possible to effectively restrain the magnetic noises leaking outside via the bracket body 26d.

SECOND EXAMPLE

Figure 3:
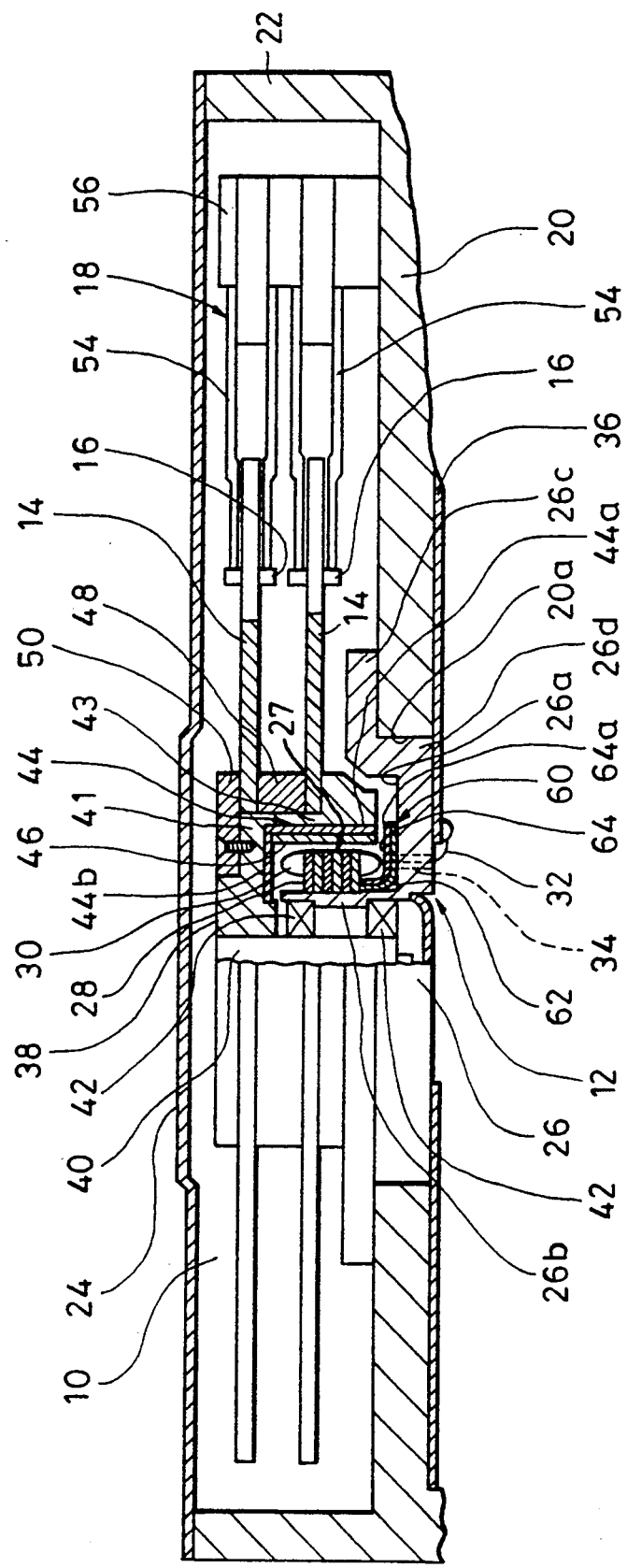
FIG. 3 is a sectional view showing the principal portion of a second example of the magnetic recording device according to the present invention.
Figure 4:
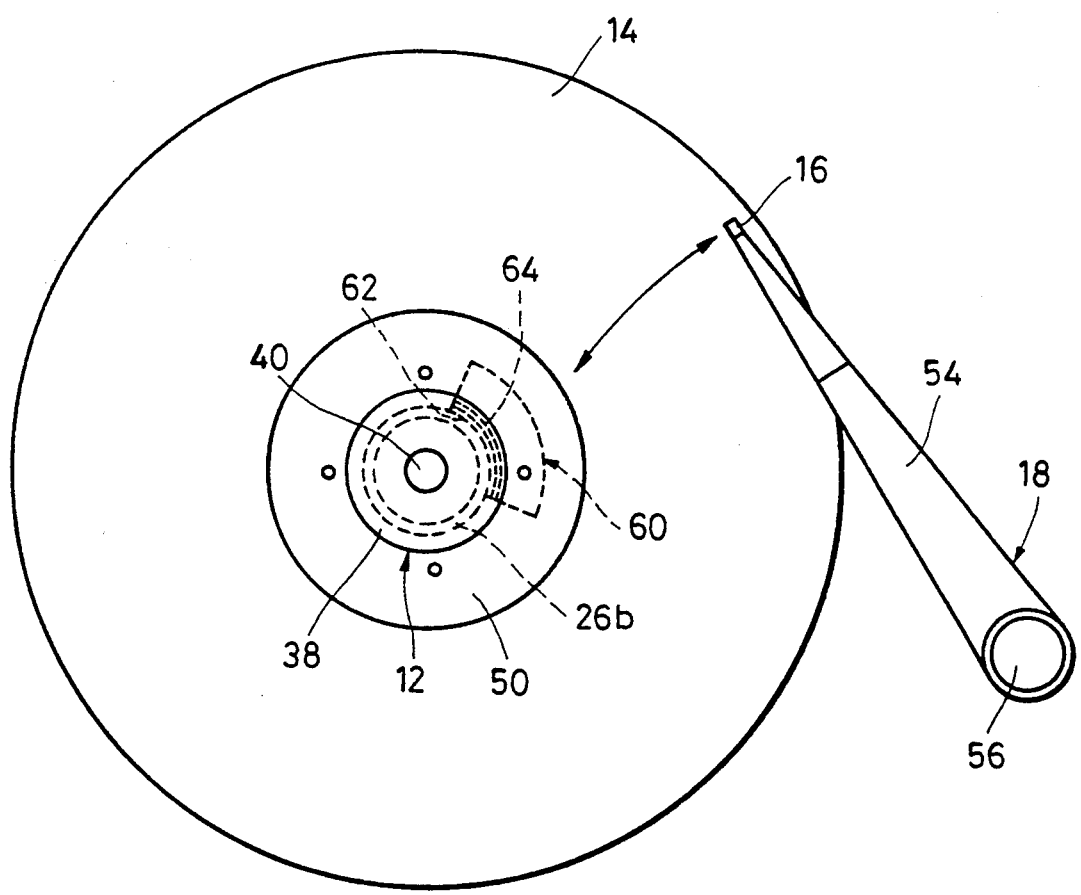
FIG. 4 is a plan view showing a spindle motor of the recording device of FIG. 3 and the vicinity thereof.

FIGS. 3 and 4 show a second example of the magnetic recording device according to the present invention. In this second example, the arrangement is not that the magnetic shield is provided annularly on the inner surface of the bracket but that the magnetic shield is disposed over a range through a predetermined angle in a position corresponding to a region in which the magnetic head shifts. In the following explanation, the same members as those in the first concrete example are marked with the like numerals.

Referring to FIGS. 3 and 4, in place of the magnetic shield composed of Permalloy, according to the second concrete example, a magnetic sheet 60 is provided on a part on the inner surface of the bracket body 26d of the bracket 26. The magnetic sheet 60 (constituting a second magnetic shield) includes an insulating sheet 62 formed of polyimide conceived as an insulating material. A magnetic film 64 is formed on the surface of this insulating sheet 62. The magnetic film 64 can be formed by applying and drying a coating in which a magnetic powder is diffused in, e.g., a vehicle.

The magnetic sheet 60 assumes a substantially fan-like shape expanding outside. The insulating sheet 62 is pasted to the inner surface of the bracket body 26d, thus fitting the sheet 60 to the bracket 26. In the example, as depicted in FIGS. 3 and 4, the magnetic sheet 60 is provided corresponding to the region in which the magnetic head shifts. The magnetic sheet 60 extends over a range through approximately 45 degrees (approximately 90 degrees on the whole) on both sides of a route along which the magnetic head 16 shifts. An inner end part of the magnetic sheet 60 extends from the inner surface of the bracket body 26d to a lower outer peripheral surface of the support wall 26b; and the inner end thereof extends up to the lower surface of the stator core 28. An outer edge 64a of the magnetic sheet 60 is positioned opposite in close proximity to the sleeve portion 44a of the yoke member 44. Therefore, the magnetic sheet 60 covers the lower surfaces of the stator 27 and of the rotor magnet 46 over a range through a predetermined angle (approximately 90 in the example) and at the same time covers a part of the inner peripheral surface of the support wall 26b, protruded downwards from the stator 28 and the coil 30.

Other configurations in the second example are virtually the same as those in the first example shown in FIG. 2, and hence the detailed descriptions thereof will be omitted.

In the second example also, the upper surfaces of the stator 27 and of the rotor magnet 46 are covered with the annular sheet portion 44b of the yoke member. The outer peripheral surfaces thereof in the radial directions are covered with the sleeve portion 44a of the yoke member 44. Besides, the specific portions of the lower surfaces (corresponding to the region in which the magnetic head 16 shifts) are covered with the magnetic sheet 60. Therefore, most of the magnetic noises produced pass through the magnetic path configured by the yoke member 44 and the magnetic sheet 60. In accordance with the second example also, the same effects as those of the first example are attained. Particularly in the second example, the magnetic sheet 60 is merely disposed at the specific portion of the bracket body 26d, and hence the adverse influences of the magnetic noises can be effectively prevented with the relatively small magnetic sheet 60. The magnetic sheet 60 extends up to the lower part of the support wall 26b of the bracket 26. It is therefore possible to prevent a leakage of magnetic flux more effectively than in the first example.

For the purpose of effectively preventing the detrimental influences of the electromagnetic noises on the magnetic head 16, it is desirable that the outer peripheral edge 52a of the magnetic shield 52 in the first example and the outer edge 64a of the magnetic sheet 60 be not protruded outwards in the radial directions from the sleeve portion 44a of the yoke member 44. It is also desirable to diminish spacings between the magnetic shield 52, the magnetic sheet 60 and the sleeve portion 44a of the yoke member 44 to the greatest possible degree.

In the first and second examples, the sleeve portion 44a and the sheet portion 44b of the yoke member 44 are integrally formed. These components may, however, be formed separately and provided on the inner peripheral surface of the hub body 39 of the hub 38 and the inner surface of the end wall 41, respectively.

THIRD EXAMPLE

Figure 5:
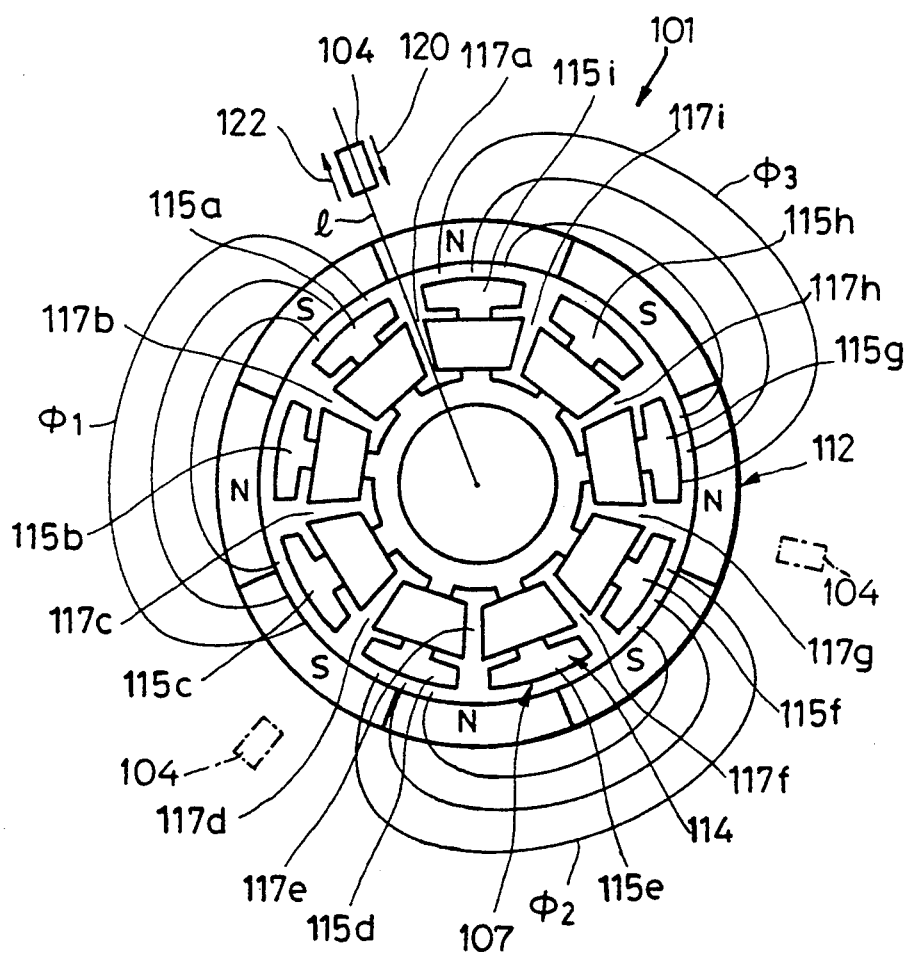
FIG. 5 is a plan view schematically showing the principal portion of a third example of the magnetic recording device according to the present invention.

Referring next to FIGS. 5 and 6, a third example of the magnetic recording device according to the present invention will be described. Given in this third example is a specific positional relation between the stator and the shifting route of the magnetic head, thereby reducing the adverse influences of the magnetic noises.

Referring to FIG. 5, a spindle motor 101 used in the magnetic recording device includes a stator 107 and a rotor magnet 112 rotatably disposed outwardly of the stator 107. As in the first example, the stator 107 is fixed to a bracket (not illustrated) mounted on a lower frame of the recording device. The rotor magnet 112 is attached to a hub (not shown) rotatably supported through a pair of bearing members. A recording member (not illustrated) such as a magnetic disc is fitted to this hub.

In the third example, the stator 107 has a stator core 114 configured by laminating silicon steel plates. The spindle motor 101 is a 3-phase brushless motor. In this connection, the stator core 114 is provided with 9 slots 117a to 117i disposed virtually at equal spacings in the peripheral direction. These 9 slots 117a to 117i prescribe 9 pieces of stator poles 115a through 115i.

The stator poles 115a through 115i are, as illustrated in FIGS. 6-A to 6-C, wound with coils 116a to 116c. To be specific, the first phase coil 116a is, as shown in FIG. 6-A, wound clockwise on the stator pole 115a. Next, the coil 116a is wound anticlockwise on the second stator pole 115b and further wound clockwise on the third stator pole 115c. Therefore, in three pieces of continuous stator poles 115a through 115c, when electrifying the coil 116a, the adjacent stator poles have polarities opposite to each other. Subsequently, the second phase coil 116b is, as illustrated in FIG. 6-B, wound clockwise on the stator pole 115d and then wound anticlockwise on the fifth stator pole 115e. The coil 116b is further wound clockwise on the sixth stator pole 115f. Furthermore, the third phase coil 116c is, as depicted in FIG. 6-C, wound clockwise on the seventh stator pole 115g and then wound anticlockwise on the eighth stator pole 115h. The coil 116c is further wound clockwise on the ninth stator pole 115i. Hence, in the second phase (the third phase) also, the three pieces of continuous stator poles 115d through 115f (115g through 115i) are arranged such that the adjacent stator poles exhibit, when electrifying the coil 116b (116c), polarities opposite to each other.

The rotor magnet 112 is 8-pole-magnetized virtually at equal spacings in the peripheral direction. More specifically, as illustrated in FIG. 5, the inner peripheral portion thereof is magnetized to exhibit N and S poles, alternately.

The magnetic head 104 of the magnetic recording device is disposed corresponding to phase-switching slots. The phase-switching slots are those provided at portions, wound with the phase-different coils, of the stator poles positioned on both sides. Conceived as phase-switching slots in the third example are a slot 117d between the third stator pole 115c and the fourth stator pole 115d, a slot 117g between the sixth stator pole 115f and the seventh stator pole 115g and a slot 117a between the ninth stator pole 115i and the first stator pole 115a. As indicated by the solid line in FIG. 5, the magnetic head 104 is disposed corresponding to the slot 117a. Effects which will be mentioned later are obtained even when the magnetic head 104 is, as indicated by two-dotted line in FIG. 5, disposed corresponding to the slot 117d or 117g.

The magnetic head 104 is, as in the case of, e.g., the first example, shifted back and forth in the directions indicated by arrowheads 120 and 122 by a shift means (not shown) including an arm or the like. The magnetic head 104 shifts virtually rectilinearly on an axial line 1 which connects a rotational center of the hub (not illustrated) to the crosswise center of the slot 117a.

In the spindle motor 101 described above, when electrifying the coil 116a (or 116b, 116c), a magnetic flux $\phi_1$ ($\phi_2$, $\phi_3$) is, as schematically shown by the solid line in FIG. 5, generated from the stator poles 115a to 115c (or 115d to 115f, 115g to 115i) of the stator core 114. Hence, as can be easily understood, troughs of magnetic fluxes are produced between the slots 117a, 117d and 117g. An intensity of a leakage magnetic flux decreases in those portions. On the other hand, in accordance with the third example, the magnetic head 104 shifts virtually straight outwardly of the crosswise center of the slot 117a. As a result, this reduces the adverse influence of the leakage magnetic flux on the magnetic head 104. The write (and/or read) errors of the magnetic information are remarkably reduced.

This fact was confirmed from a test made by the inventor. An electromotive force generated in an iron core is measured outwardly of the stator pole 115d by using the iron core in place of the magnetic head. In this case, the electromotive force is about 140 mV. However, when measuring the electromotive force generated in the iron core outwardly of the slot 117a, it is approximately 80 mV. As is obvious from this test result, the bad influence of the leakage magnetic flux are smaller by approximately 43% in the measurement outside the slot 117a than in the measurement outside the stator pole 115d.

EMBODIMENT AND COMPARATIVE EXAMPLE

Figure 7:
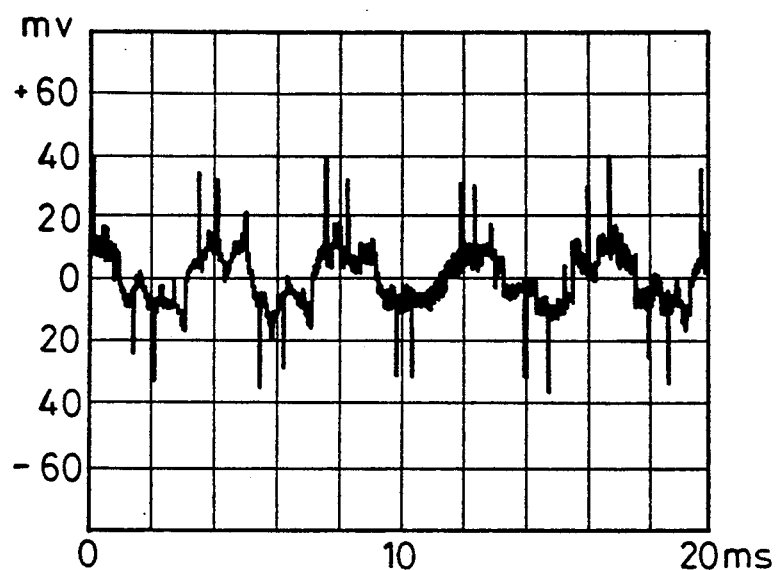
FIG. 7 is a diagram showing a measurement result of electromagnetic noises in an embodiment.

The following is a description of an embodiment. A spindle motor 12 in the magnetic recording device illustrated in FIGS. 1 and 2 is operated in a state where a hard disc 14, a spacer 48 and a clamp member 50 are removed. The electromagnetic noises are measured by an electromagnetic sensor in a position apart upwards 2 mm in FIG. 2 from the upper surface of a flange portion 43 of a rotor hub 38 and apart outwards 1.5 mm in the radial directions from the outer peripheral surface of the rotor hub 43 above the flange portion 38a. A measurement result shown in FIG. 7 is obtained. The maximum value of the output voltage of the electromagnetic sensor is approximately 40 mV.

Figure 8:
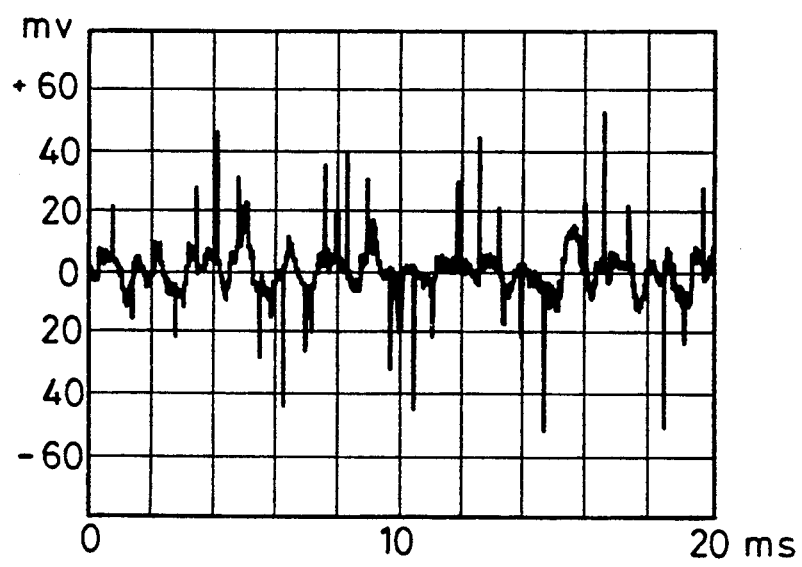
FIG. 8 is a diagram showing measurement results of electromagnetic noises in a comparative example.

The following is an explanation of a comparative example. FIG. 8 shows a measurement result in the same way as the above-described embodiment by use of a magnetic recording device. This recording device is virtually the same except for the arrangement that the magnetic shield 52 is omitted. It can be understood that the level of the pulse electromagnetic noises is considerably higher than in FIG. 7. The maximum value of the output voltage of the electromagnetic sensor is about 52 mV which is larger by 30% than the value in the above-mentioned measurement result.

Although the embodiments of the present invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A magnetic recording device exhibiting reduced electromagnetic interference comprising:
   a magnetic recording medium;
   a spindle motor for rotationally driving said magnetic recording medium;
   an electromagnetic means for writing and/or reading magnetic information to and/or from said magnetic recording medium; and
   a shift means for shifting said electromagnetic means along a surface of said magnetic recording medium;
   said spindle motor including a bracket, a hub relatively rotatable about said bracket and mounted with said magnetic recording medium, a stator, a rotor magnet having eight poles disposed opposite to and extending peripherally about said stator and attached to said hub, said stator including nine stator poles in combination with slots defined by spacings between adjacent stator poles and 3-phase coils wound on said nine stator poles, a first 3-phase coil being wound on first, second and third immediately adjacent stator poles so that adjacent stator poles exhibit opposite polarities, a second 3-phase coil being wound on fourth, fifth and sixth immediately adjacent stator poles so that adjacent stator poles exhibit opposite polarities, a third 3-phase coil being wound on seventh, eighth and ninth immediately adjacent stator poles so that adjacent stator poles exhibit opposite polarities, a shift route of the electromagnetic means extends outwardly virtually in the radial direction from a specific slot, said specific slot being defined as any one of said slots between said third and fourth stator poles, between said sixth and seventh stator poles, and between said ninth and first stator poles.

* * * * *